United States Patent [19]
Kataumi

[11] Patent Number: 6,148,686
[45] Date of Patent: Nov. 21, 2000

[54] SHIFT LEVER APPARATUS FOR AUTOMATIC TRANSMISSION

[75] Inventor: Yoshimasa Kataumi, Saitama, Japan

[73] Assignee: Fuji Kiko Co., Ltd., Tokyo, Japan

[21] Appl. No.: 09/141,341

[22] Filed: Aug. 27, 1998

[30] Foreign Application Priority Data

Aug. 29, 1997 [JP] Japan .................................. 9-233470

[51] Int. Cl.[7] .............................................. F16H 59/10
[52] U.S. Cl. ................................ 74/473.18; 74/473.12
[58] Field of Search ........................... 74/473.18, 471 R, 74/473.1, 473.12, 473.21

[56] References Cited

U.S. PATENT DOCUMENTS

| | | | |
|---|---|---|---|
| 5,062,314 | 11/1991 | Maier et al. | 74/475 |
| 5,689,996 | 11/1997 | Ersoy | 74/335 |
| 6,012,352 | 1/2000 | Ishii et al. | 74/473.18 |

FOREIGN PATENT DOCUMENTS

| | | |
|---|---|---|
| 0 413 932 | 2/1991 | European Pat. Off. . |
| 0 575 658 | 12/1993 | European Pat. Off. . |
| 0 754 884 | 1/1997 | European Pat. Off. . |
| 0 770 799 | 5/1997 | European Pat. Off. . |
| 0 784 169 | 7/1997 | European Pat. Off. . |
| 7-32902 | 2/1995 | Japan . |
| 7-32903 | 2/1995 | Japan . |
| 7-32904 | 2/1995 | Japan . |
| 7-35224 | 2/1995 | Japan . |

*Primary Examiner*—David Fenstermacher
*Attorney, Agent, or Firm*—Foley & Lardner

[57] ABSTRACT

A shift lever apparatus combines an automatic transmission mode and a manual transmission mode. An end portion of a position pin engages with a guide lever. The guide lever comprises a guide hole. When the guide lever is swingably supported by a transverse shaft and a shift lever is moved into the manual transmission mode, an upside edge of the guide hole stops and lowers the end portion of the position pin. Thus, the position pin can swing between an R range and an L range.

11 Claims, 7 Drawing Sheets

SHIFT LEVER APPARATUS FOR AUTOMATIC TRANSMISSION

BACKGROUND OF THE INVENTION

The present invention relates to a shift lever apparatus for an automatic transmission combining an automatic transmission mode (A/T mode) and a manual transmission mode (M/T mode) of a vehicle.

Such a shift lever apparatus is operated in a manner that a particular gear shift mode is selected by a shift lever swingably moving in a front and rear direction. Japanese Unexamined (KOKAI) Patent Publications No. 7(1995)-32902, No. 7(1995)-32903, No. 7(1995)-32904 and No. 7(1995)-35224 disclose several shift lever apparatuses for automatic transmissions in which a change between the automatic shift mode and the manual shift mode can be easily and appropriately executed so that a driver feels a manual operation.

However, in such shift lever apparatuses for automatic transmissions, a stroke for swingably moving a shift lever in the front and rear direction in the M/T mode is usually shorter than a stroke for swingably moving a shift lever in the front and rear direction in the A/T mode. Therefore, this shorter stroke in the M/T mode gives the driver an uncomfortable operational feeling.

That is, if a shift lever 33 is swung sideways from an upright position around a longitudinal shaft 19, a position pin 27 is inclined with the shift lever 33 as shown in FIG. 7. The shift lever 33 can swing on a cylindrical shaft 14 in the front and rear direction of the vehicle in the A/T mode. The longitudinal shaft 19 extends along the front and rear direction and the cylindrical shaft 14 extends along a left and right direction. The position pin 27 passes through a slot 28. The slot 28 is formed at a lower part of a compression rod 34 inserted into the shift lever 33. In the inclined state, an end portion of the position pin 27 is out of a detent notch portion 54 and is inserted into a housing 11, while the other end of the position pin 27 is lowered without getting out of a detent notch portion 54 on the other side.

However, because the other end of the position pin 27 does not move downward beyond transmission steps 54a and 54b of an R range and an L range, a maximum stroke of the position pin 27 in the M/T mode is limited within a substantially same angle α in the front and rear direction around a D range, that is, a range between an N range and an S range, as shown in FIG. 8.

Therefore, a shift slot 23e for the M/T mode is shorter than a shift slot 23 for the A/T mode as shown in FIG. 9, and a swing stroke of the shift lever 33 in the M/T mode is short. The shift slots 23 and 23e are formed on an indicator 22. A reference numeral 11 denotes a base bracket mounting the indicator 22, a reference numeral 24 denotes a knob fixed at an upper part of the shift lever 33 and a reference numeral 38 denotes a push button movably installed on the knob.

SUMMARY OF THE INVENTION

It is therefore an object of the present invention to provide a shift lever apparatus for an automatic transmission which has a shift feeling different from a conventional shift feeling with a larger swing angle of a shift lever in an M/T mode.

According to the present invention, a shift lever apparatus for an automatic transmission comprises:

a base bracket adapted to be fixed to a vehicle body;
a shift lever comprising a shift lever main body supported on the base bracket through a transverse shaft for allowing the shift lever main body to swing in a front and rear direction, and so arranged as to allow the shift lever main body to move between an A/T mode shift slot and an M/T mode shift slot,
a position pin comprising first and second end portions for engaging with detent notch portions formed in first and second side wall portions of the base bracket when the shift lever main body is in the A/T mode shift slot,
a push button mounted on an upper portion of the shift lever main body, and
a projecting portion formed in the shift lever main body;
a selector lever swingably mounted on the transverse shaft, said selector lever comprising an opening for receiving the projecting portion so as to move together with the shift lever main body when the shift lever main body is in the A/T mode shift slot and for disengaging from the projecting portion so as to allow the shift lever main body to swing in the front and rear direction and to turn on an electric switch when the shift lever main body is in the M/T mode shift slot; and
a guide lever, swingably mounted on the transverse shaft, comprising a guide hole for engaging with the first end portion of the position pin, said guide hole comprising an upside edge for limiting upward movement of the first end portion of the position pin and thereby causing the position pin to incline and descend to a low place to allow the position pin to swing between an R range and an L range in detent notch portions when the shift lever is changed into the M/T mode shift slot.

Therefore, when the shift lever is in the M/T mode, a stroke for swingably moving the shift lever in the front and rear direction can be longer than a conventional stroke and the shift feeling in the M/T mode is improved.

DETAILED DESCRIPTION OF THE INVENTION

The following is an explanation of one embodiment of the present invention with reference to the drawings.

Figure 1:
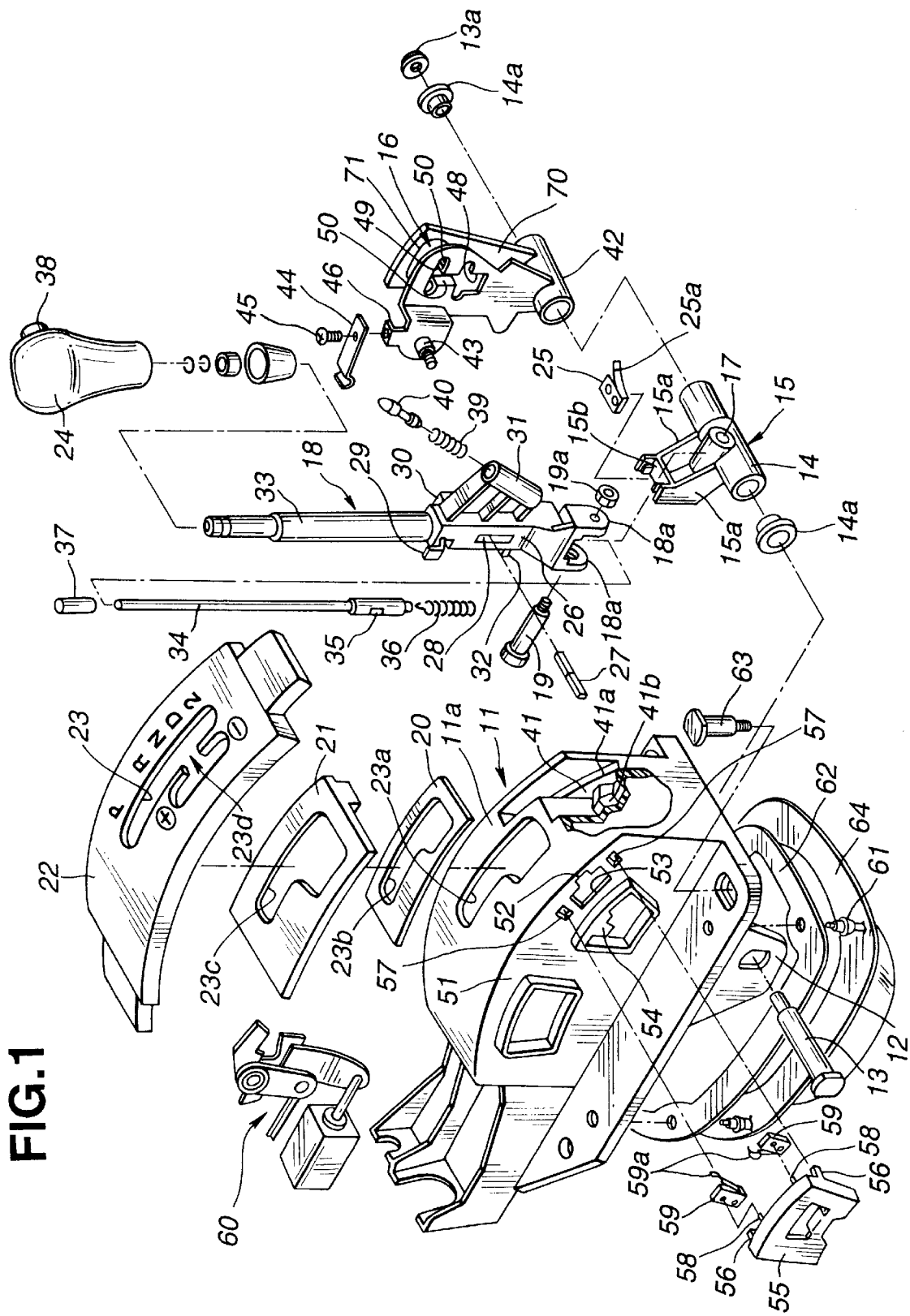
FIG. 1 is an exploded perspective view of one embodiment of a shift lever apparatus according to the present invention.

As shown in FIG. 1, a confronting pair of hinge portions 12 project from a bottom portion of a base bracket 11 which is adapted to be fixed to a floor of a vehicle body. A shift lever base 15 and a selector lever 16 are supported swingably in the front and rear direction of the vehicle, on a transverse shaft 13 through a transverse cylindrical shaft 14. The transverse shaft 13 is supported between the hinge portions 12 and passes through the transverse cylindrical shaft 14.

The shift lever base 15 of this example includes the transverse cylindrical shaft 14 and a longitudinal shaft 17. The transverse cylindrical shaft 14 extends along the left and right direction and the longitudinal shaft 17 extends along the front and rear direction above the transverse cylindrical shaft 14. A shift lever main body 18 includes a pair of front and rear brackets 18a which are engaged with the longitudinal shaft 17 by a longitudinal shaft 19 passing through the brackets 18a and screwed with a nut 19a. The shift lever main body 18 is swingable in the left and right direction of the vehicle. The shift lever main body 18 passes through shift slots 23a, 23b, 23c and 23 and extends upward. The shift slots 23a, 23b, 23c and 23 are formed respectively in a top board 11a of the base bracket 11, a buffer member 20, a light-guide plate 21 and an indicator 22. A knob 24 is mounted on a top portion of the shift lever main body 18. The shift lever main body 18 passes through slide plates 22b and 22c slidably inserted between the indicator 22 and the lightguide plate 21. (Refer to FIGS. 2 and 3).

The shift lever base 15 is a single unit comprising the transverse cylindrical shaft 14 and the longitudinal cylindrical shaft 17 formed on the transverse shaft 14. The shift lever base 15 further includes a pair of left and right supporting portions 15a projecting upwards obliquely on both sides of the longitudinal shaft 17. Upper portions of the supporting portions 15a are connected with each other to form a U-shaped switch fixing portion 15b with two pillar-shaped projections. A limit switch 25 is fixed to the switch fixing portion 15b in such a manner that holes formed in the limit switch 25 are engaged with the pillar-shaped projections. An actuating piece 25a of the limit switch 25 performs an on-off switching by contacting with or separating from a projection 32 formed on a side surface of the shift lever main body 18. The limit switch 25 functions to input a selection signal of the A/T mode and the M/T mode into a control section of the automatic transmission.

The shift lever main body 18 comprises a square column portion 26 integrally formed with the bracket portions 18a. The square column portion 26 extends upwards from the bracket portions 18a. The square column portion 26 further includes a slot 28 opening in both left and right side surfaces of the square column portion 26. The slot 28 extends vertically along a longitudinal direction of the square column portion 26. A position pin 27 extends along the left and right direction, and passes through the slot 28. The slot 28 allows the position pin 27 to move vertically. The main body 18 has a hook-shaped stopper lever 29 integrally formed in the vicinity of an upper portion of the square column portion 26. The hook-shaped stopper lever 29 of this example projects from the left side surface of the square column portion 26. The main body 18 further has a substantially trapezoid-shaped projecting portion 30 projecting from the right side surface of the square column portion 26. The projection 32 for operating the actuating piece 25a of the limit switch 25 is formed at a lower portion of a front side of the square column portion 26. A cylindrical portion 31 projecting obliquely and rearwardly is integrally formed at a rear side surface of the square column portion 26.

Figure 3:
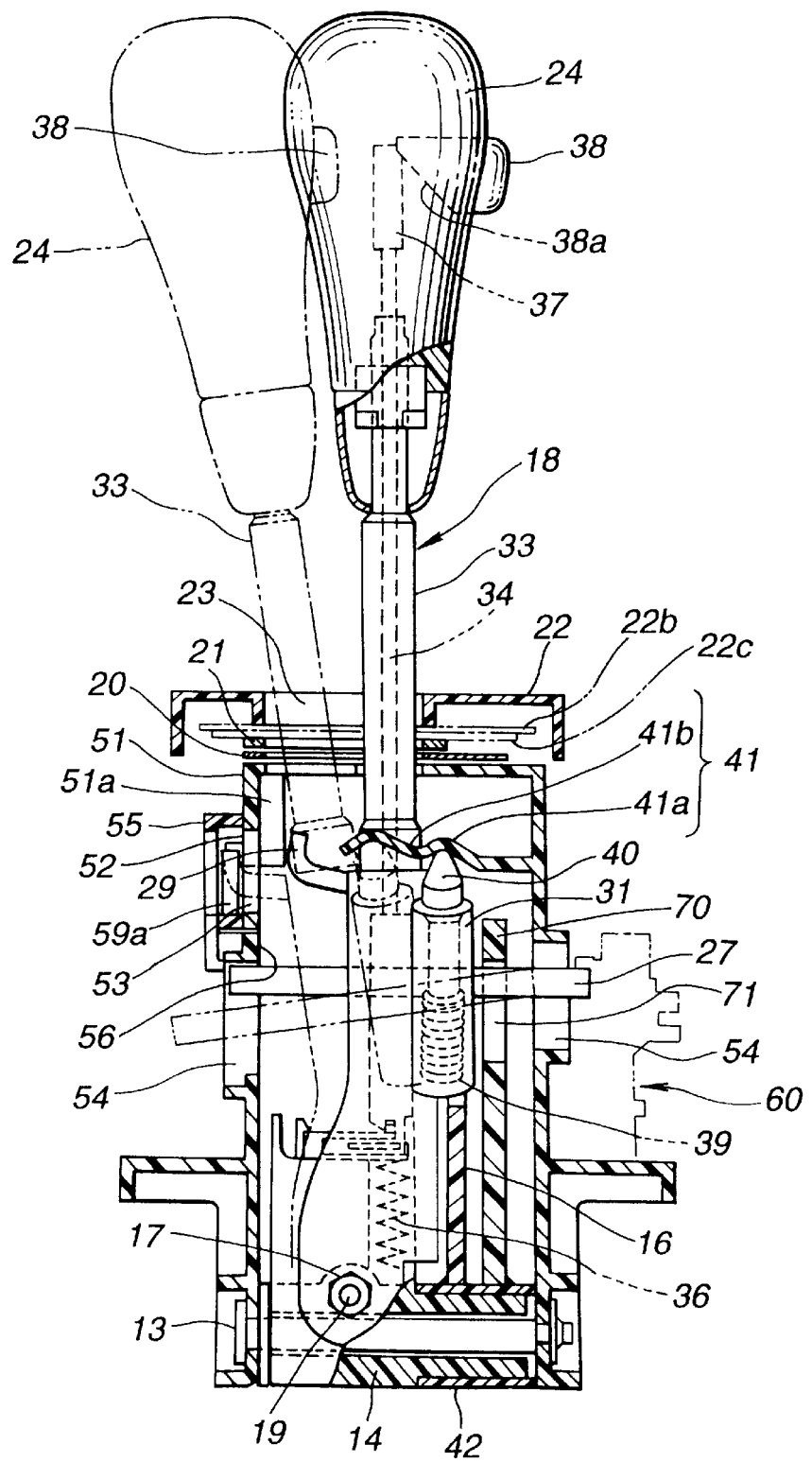
FIG. 3 is a cross-sectional front view of FIG. 2.
Figure 4:
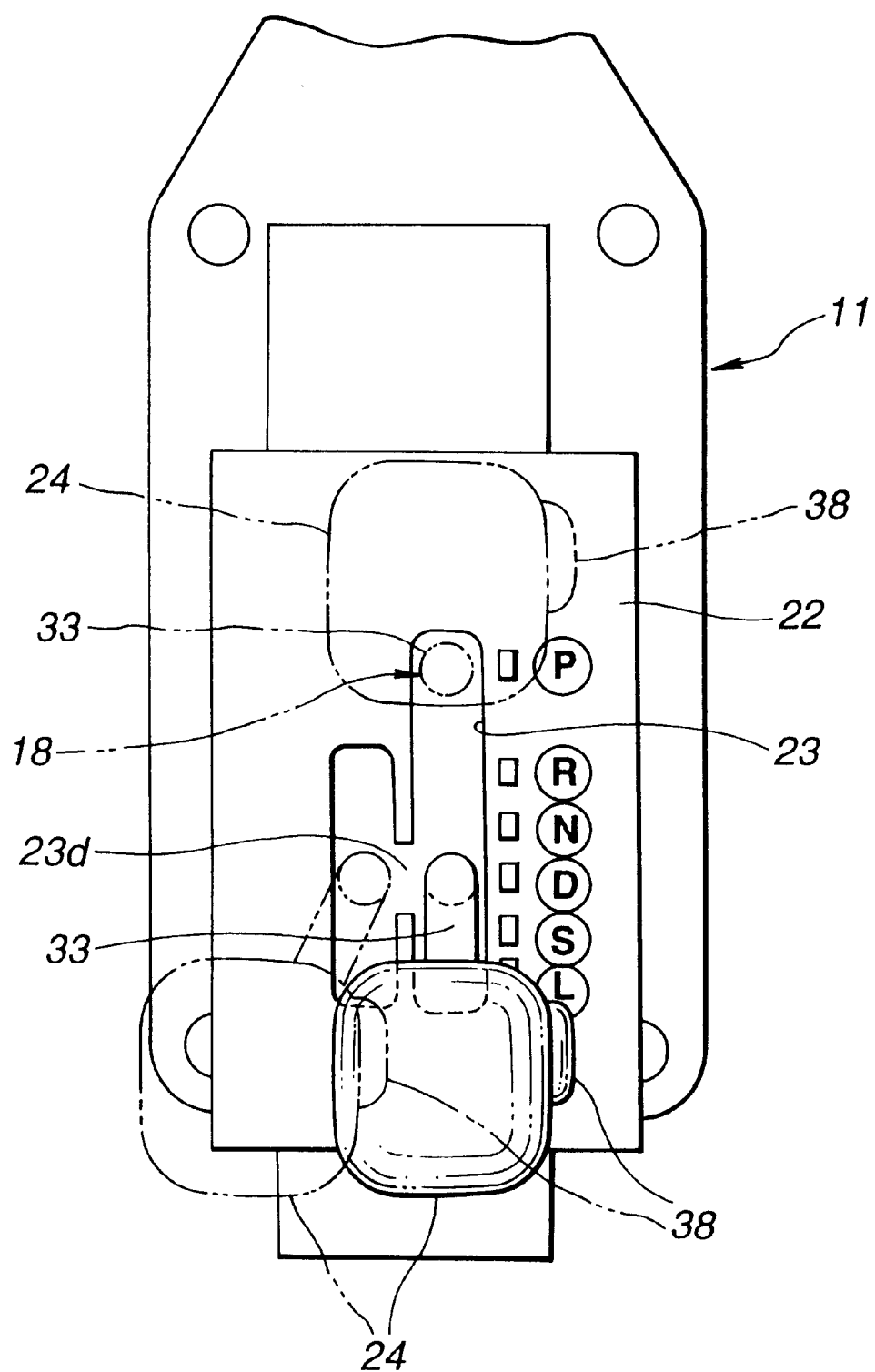
FIG. 4 is a view of FIG. 2

At an upper portion of the square column portion 26, a two-step cylindrical column portion 33 is integrally formed. The cylindrical column portion 33 extends upwards from the top of the square column portion 26 in alignment with the square column portion 26. A compression rod 34 is inserted into the square column portion 26 and the cylindrical column portion 33 from a lower portion of the brackets 18a. The compression rod 34 has a larger diameter portion near the lower end of the compression rod 34, and the large diameter portion is formed with a hole 35. The position pin 27 is press-fittingly inserted in the hole 35. A coil spring 36 is resiliently disposed between the compression rod 34 and the longitudinal cylindrical shaft 17. The top of the compression rod 34 is covered with a cap 37 and extends into the knob 24. In the knob 24, the cap 37 abuts on an downwardly facing oblique surface 38a of a knob button 38 installed in the knob 24 as shown in FIGS. 1 and 3.

A coil spring 39 is inserted into the cylindrical portion 31. The coil spring 39 pushes a ball-head projection shaft 40. The ball-head projection shaft 40 is in sliding contact with a positioning portion 41 formed at an inner surface of the base bracket 11. The positioning portion 41 comprises a groove 41a and a valley-shaped groove 41b. Because the ball-head projection shaft 40 moves in the front and rear direction of the vehicle when the shift lever main body 18 is in the A/T mode shift slot, the ball-head projection shaft 40 is in slide contact with the groove 41a. Because the ball-head projection shaft 40 moves in the left and right direction of the vehicle when the shift lever main body 18 is moved into the M/T mode shift slot, the ball-head projection shaft 40 is in slide contact with the groove 41b.

The selector lever 16 is a substantially sector-shaped plate. The transverse shaft 13 passes through a cylindrical shaft 42 which is integrally formed with a swing base of the selector lever 16. A shaft projection 43 for axially connecting a shift-cable or a shift-rod is formed at a front end portion of the vehicle. A bracket portion 46 is integrally formed with the selector lever 16. A plate spring 44 is fixed to the bracket portion 46 by a screw 45. The cylindrical shaft 42 is mounted on an end of the cylindrical shaft 14 of the shift lever base 15. A pair of bushes 14a are inserted into both end portions of the cylindrical shaft 14. The transverse shaft 13 is inserted from the outside into the hinge portion 12 on one side, and a push nut 13a is screwed on an end portion of the transverse shaft 13 on the other side to prevent extraction of the shaft 13. A guide lever 70 in the form of a substantially sector-shaped plate is fixed on the cylindrical shaft 42. In this example, the guide lever 70 is substantially in parallel with the selector lever 16. The guide lever 70 comprises a guide hole 71 in the form of a substantially sector-shaped opening. The position pin 27 passes through the guide hole 71.

The plate spring 44 is in slide contact with the positioning portion 47. (Refer to FIG. 2) The driver can feel a moderate resistance in each shift range position when the shift lever main body 18 is rotated with the selector lever 16 in the A/T mode. The selector lever 16 is held in a D range position by a sliding force of the plate spring 44 when the shift lever main body 18 is in the M/T mode. At a substantially center portion of the selector lever 16, substantially trapezoid-shaped openings 48 and 49 are continuously formed.

The opening 49 has a pair of guide pieces 50 bent outwards. The trapezoidal projecting portion 30 in the side face of the square column portion 26 of the shift lever main body 18 is engaged with and disengaged from the trapezoidal opening 49. The projecting portion 30 is engaged with the guide pieces 50 when the shift lever main body 18 is in the A/T mode of the shift slot 21 and the projecting portion 30 is disengaged from the opening 49 when the shift lever main body 18 rotates in a direction separating from the selector lever 16. Even if the projecting portion 30 is out of the opening 49, an end portion of the position pin 27 is still in the opening 48. In this state, however, the position pin 27 does not interfere with the edge of the opening 48 of the selector lever 16. Therefore, the opening 48 is formed in a substantially sector shape to allow the position pin 27 to move smoothly in the front and rear direction when the shift lever main body 18 is in the M/T mode shift slot.

An opening 52 and a wider opening 53 are continuously formed in the base bracket 11. When the shift lever main body 18 is rotated leftward on the longitudinal shaft 19 and the projecting portion 30 disengages from the opening 49, the opening 52 receives the stopper lever 29 to prevent interference with the left side wall portion 51 of the base bracket 11, and the elongated opening 53 allows the stopper lever 29 to move in the front and rear direction of the vehicle. Detent notch portions 54 are formed, respectively, in the left and right side wall portions 51 of the base bracket 11. The position pin 27 is in sliding contact with the detent notch portion 54 on each side. The left side detent notch portion 54 is located below the opening 53. A stopper portion 51a in the form of a thick wall portion or a rib portion is formed in the inner surface of the left side wall portion 51. The stopper lever 29 abuts or slides on the stopper portion 51a when the shift lever main body 18 is in the M/T mode. (Refer to FIG. 3).

A switch unit 55 is attached to the left side wall portion 51 so as to cover the openings 52 and 53. The switch unit 55 comprises front and rear limit switches 59 received in a concave body. The concave body is integrally formed with a pair of left and right claw projections 56. The claw projections 56 engage with engaging holes 57 formed in the left side wall portion 51. Inside the switch unit 55, pillar-shaped projections 58 are integrally formed with the switch unit 55. The limit switches 59 are fixed on the inner surface of the concave body with the projections 58 inserted in holes of the limit switches 59. Each limit switch 59 has an actuating piece 59a. Each limit switch 59 turns on when its actuating piece 59a is in contact with the stopper lever 29. When the actuating piece 59a is disconnected from the stopper lever 29, each limit switch 59 is turned off. The front limit switch 59 is located at the side of the R range position on the indicator 22. The front limit switch 59 functions for acceleration (+). The rear limit switch 59 is located at the side of the L range position on the indicator 22. The rear limit switch 59 functions for deceleration (−). The front and rear limit switches 59 deliver on-off signals to the automatic transmission.

Figure 2:
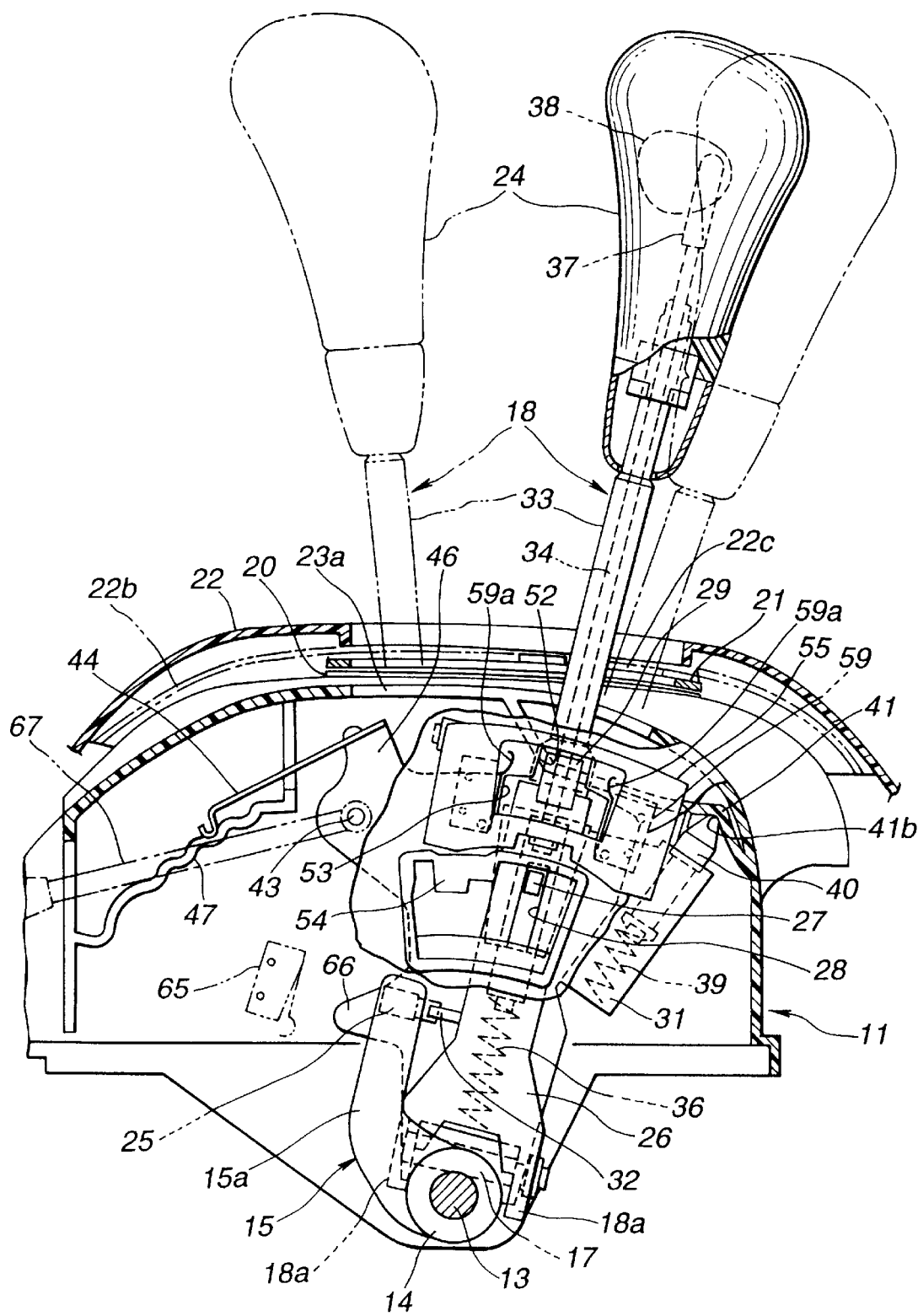
FIG. 2 is an assembled partially cross-sectional side view of FIG. 1

The base bracket 11 of this example is an integral molding of resin. A shift lock mechanism 60 is provided at the side of the base bracket 11. A rubber boot 64 is arranged at a bottom portion of the base bracket 11 by projections 61. The rubber boot 64 functions to sealingly connect the base bracket 11 with the vehicle floor. The base bracket 11 is fixed on the vehicle floor through the rubber boot 64 by bolts 63. A seal plate 62 of a thin steel sheet is arranged between the base bracket 11 and the rubber boot 64 to ensure flatness between the base bracket 11 and the vehicle floor. In FIG. 2, a reference numeral 65 denotes a limit switch. A projecting portion 66 of the selector lever 16 moves in and out of contact with the limit switch 65 and thereby operates the shift lock mechanism 60.

The following is an explanation of the manner of operation of the above-mentioned automatic transmission operating apparatus.

When the vehicle runs in the A/T mode, the shift lever main body 18 stands upright from the base bracket 11 and the driver can shift the main body 18 along the A/T slot by gripping the knob 24 and pushing the knob button 38. In this case, the shift lever main body 18 swings together with the selector lever 16 by the engagement of the projecting portion 30 of the main body 18 with the opening 49 of the selector lever 16. By the push-operation of the knob button 38, the compression rod 34 moves downwards and disengage the position pin 27 from the selected range. The shift lever main body 18 is rotated around the transverse shaft 13 along the A/T mode shift slot of the shift slots 23, 23a~23c in the front and rear direction.

During this operation, the selector lever 16 swings with the shift lever main body 18, and provides a feel of positioning in each shift range position by the biasing force of the plate spring 44 being in contact with the positioning portion 47. The guide hole 71 of the guide lever 70 receives the position pin 27, and allows the end portion of the position pin 27 to engage with the detent notch portion 54. Thus, the movement of the position pin 27 is ensured in the guide hole 71.

In the D range, the driver can move the shift lever main body 18 from the A/T mode slot to the M/T mode slot by pushing the shift lever main body 18 toward a direction separating from the selector lever 16 around the longitudinal shaft 19. The projecting portion 32 is disconnected from the limit switch 25, and turns on the limit switch 25. The limit switch 25 sends a signal for changeover to the M/T mode, to the control section of the automatic transmission. At the same time, the projecting portion 30 is disconnected from the opening 49 of the selector lever 16 and the selector lever 16 is held in the state of holding the shift cable or rod 67 (shown in FIG. 2) in the D range, by the sliding contact force of the plate spring 44 pressing on the positioning portion 47. The ball-head projecting shaft 40 moves from the groove 41a to the valley-shaped groove 41b of the portion 41 when during movement of the shift lever main body 18 in the left and right direction, and provides the drivers the moderate resistance, a feeling of position change.

Figure 5:
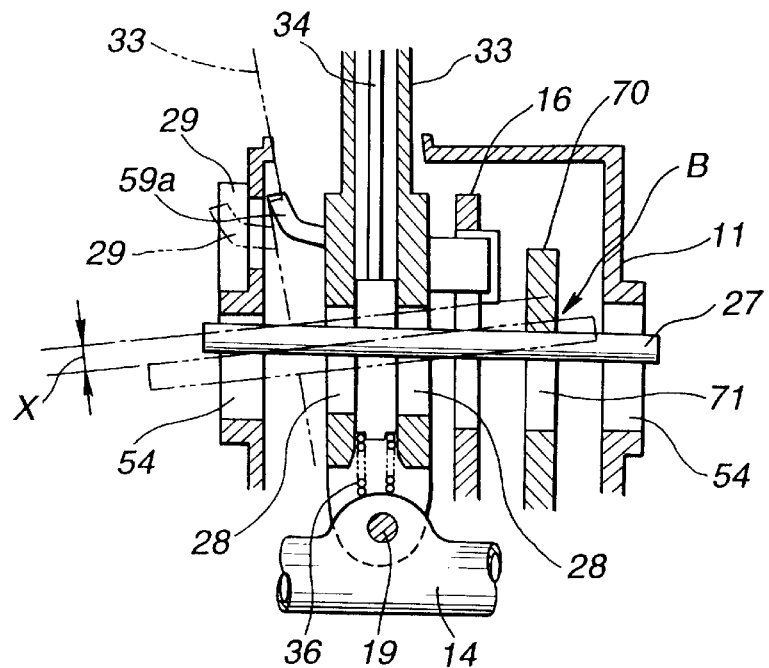
FIG. 5 is an explanatory view of a principal function of the present invention.

The swing movement of the shift lever main body 18 on the longitudinal shaft 19 from the A/T slot to the M/T slot causes the position pin 27 to incline from a substantially horizontal position shown by a solid line in FIG. 5 to an inclined position shown by a two dot chain line. In this case, the right end of the position pin 27 in FIG. 5 moves inwards out of the adjacent detent notch 54, and tries to move upwards. However, the upper edge of the guide hole 71 of the guide lever 70 limits upward movement of the right end of the position pin 27, and presses the position pin 27 downwards, compressing the coil spring 36. The position pin 27 is held in the inclined state of the two dot chain line in which the position pin 27 is lowered away from the upside edge of the slot 28 of the shift lever main body 18. In FIG. 5, a one dot chain line shows the position which the position pin 27 would assume in the conventional arrangement having no guide lever 70. In this position of the one dot chain line, the position pin 27 abuts on the upside edge of the slot 28 by the force of the coil spring 36. The position pin 27 is lowered by a distance X as shown in FIG. 5. Therefore, the end portion of the position pin 27 on the left side as viewed in FIG. 5 is lowered to the level enabling movement between the R range and the L range shown in FIG. 6. The position pin 27 can swing widely, as shown by imaginary lines in FIG. 6.

Figure 6:
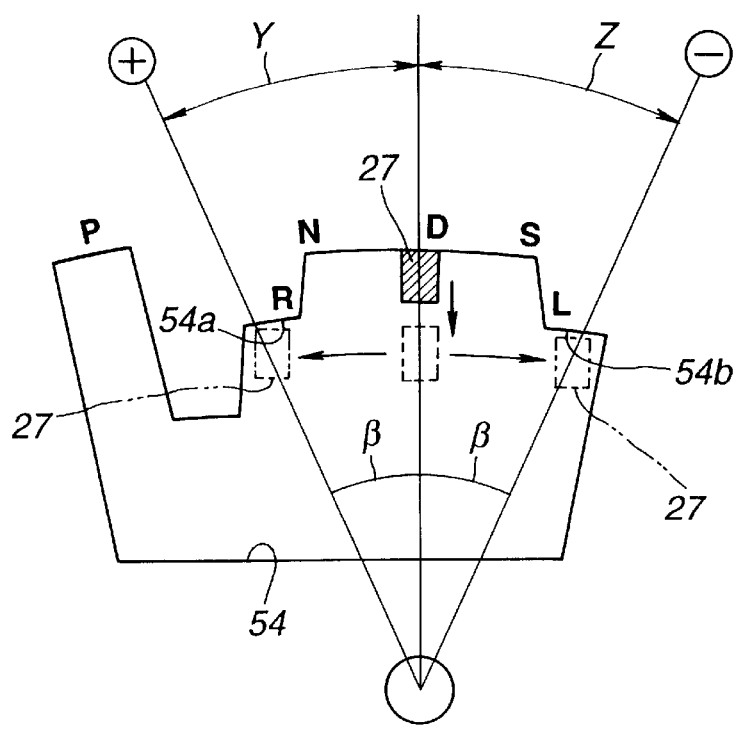
FIG. 6 is a side view explaining the principal function of FIG. 5.
Figure 7:
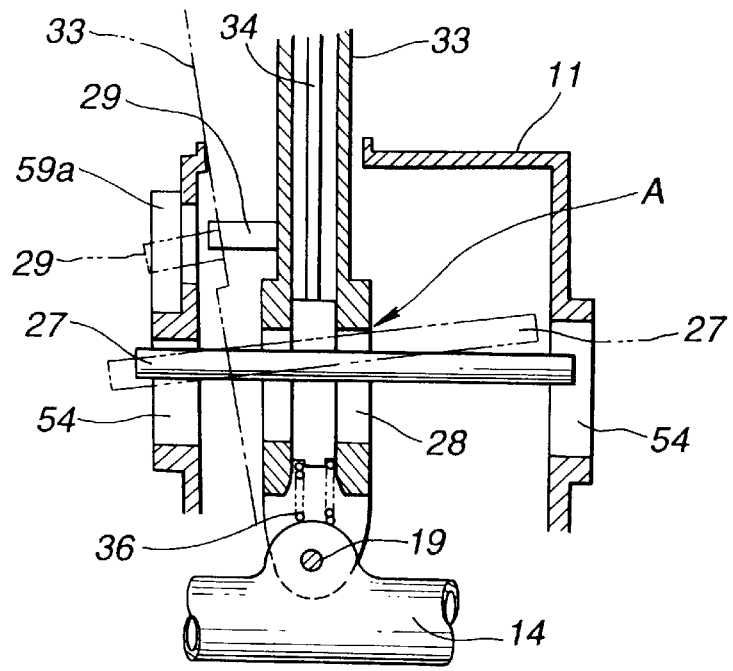
FIG. 7 is an explanatory view of a principal function of a conventional shift lever apparatus.
Figure 8:
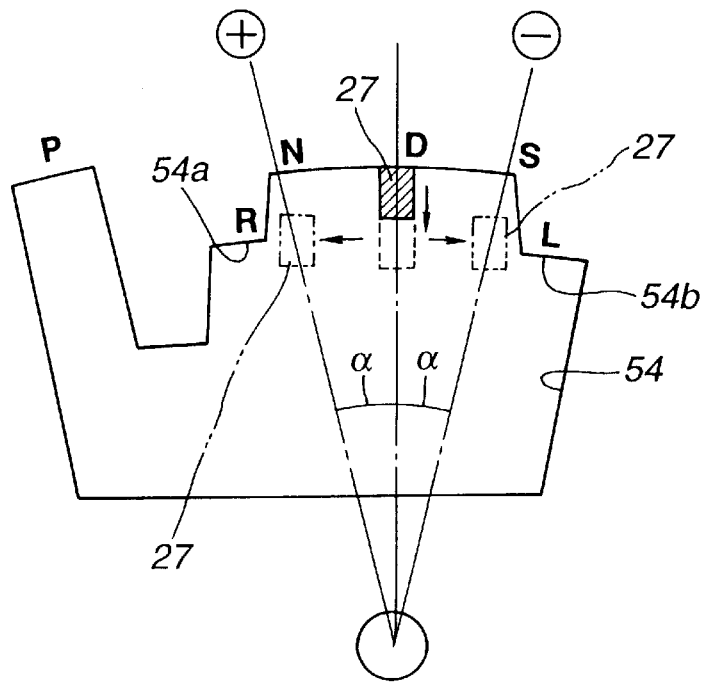
FIG. 8 is a side view explaining the principal function of FIG. 7.
Figure 9:
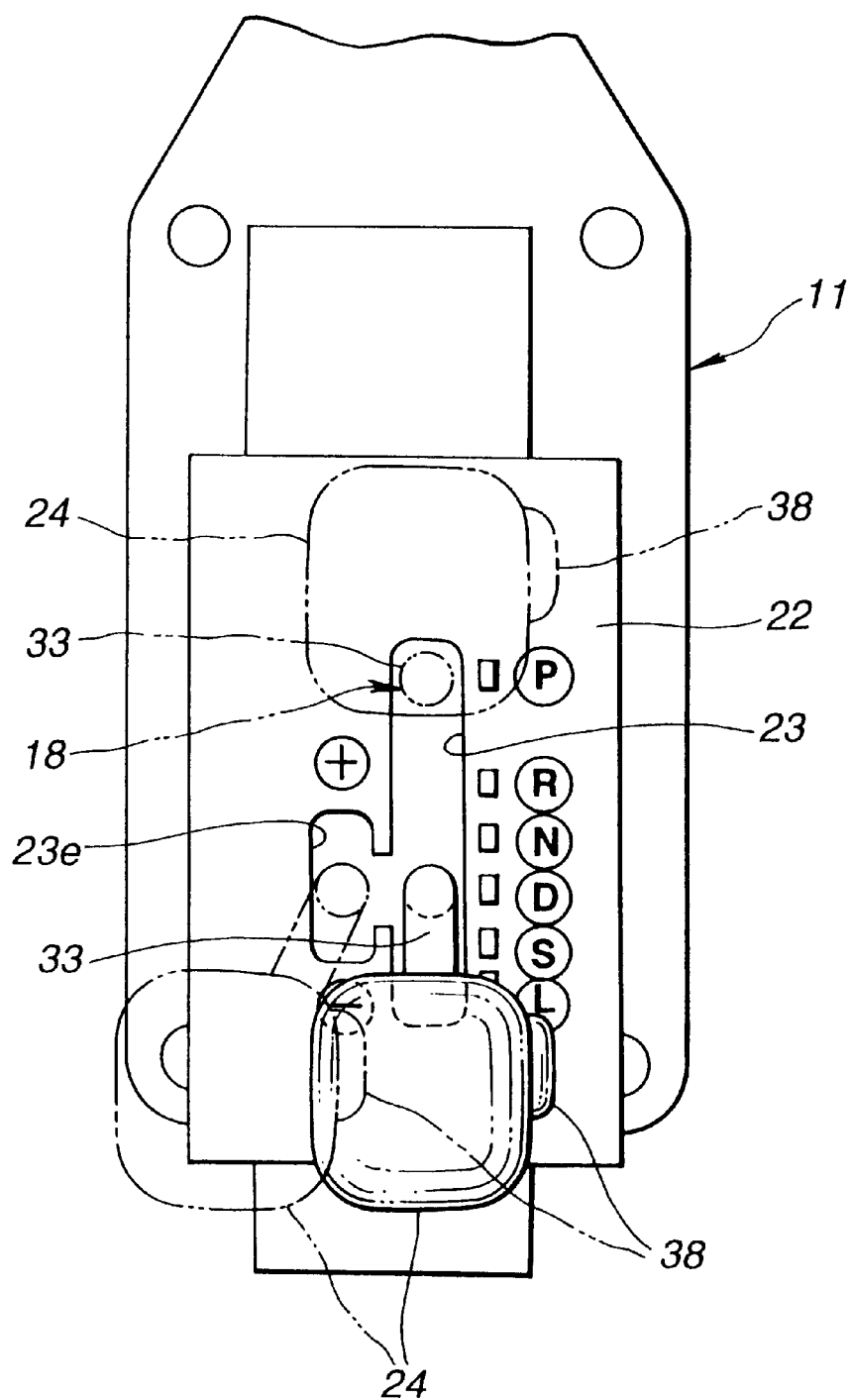
FIG. 9 is a plan view of the conventional shift lever apparatus.

If the shift lever main body 18 moves from the A/T mode shift slot to the M/T mode shift slot through a switching slot 23d, the shift lever main body 18 is inclined leftward around the longitudinal shaft 19 and the stopper lever 29 projects through the openings 52 and 53 toward the side of the bracket 11 to be located in the opening 53. In this state, the shift lever main body 18 can swing in the front or rear direction between the R range and the L range by an angle β around the D range. Therefore, the swing stroke for the M/T mode is widened, as shown in FIG. 6, from the stroke between the N range and the S range of the conventional arrangement, by the addition of the stroke between the R range and the N range and the stroke between the S range and the L range. From the D range, the driver can move the shift lever by the wide stroke Y in the forward direction and by the wide stroke Z in the rearward direction.

The limit switches 59 are fixed, respectively, at the positions corresponding to the R range and the L range. The shift lever main body 18 can swing in the front and rear direction around the transverse shaft 13, over the maximum stroke defined between the R range and the L range, providing an improved shift feeling. With this movement, the stopper lever 29 moves together in the front and rear direction of the vehicle in the opening 53, and presses the actuating piece 59a of the limit switch 59 on each side. In accordance with the shift operation of the shift lever in the M/T mode slot, the limit switches 59 send the command signal for acceleration or deceleration or upshift or downshift to the control section of the automatic transmission.

The shift lever main body 18 can return from the M/T mode to the A/T mode, at a substantially center position in the opening 53 by swinging in the rightward direction on the longitudinal shaft 19. The stopper lever 29 moves from the opening 52 into the inside of the base bracket 11, and the projecting portion 30 returns into the opening 49 of the selector lever 16 between the guide pieces 50, so that the shift lever main body 18 is engaged with the selector lever 16. The shift lever main body 18 pushes the actuating piece 25a with the projecting portion 32, and thereby turns off the limit switch 25 to change the transmission to the A/T mode.

What is claimed is:

1. A shift lever apparatus for an automatic transmission, comprising:
    a base bracket adapted to be fixed to a vehicle body;
    a shift lever comprising a shift lever main body supported on the base bracket through a transverse shaft for allowing the shift lever main body to swing in a front and rear direction, and so arranged as to allow the shift lever main body to move between an automatic transmission (A/T) mode shift slot and a manual transmission (M/T) mode shift slot,
    a position pin comprising first and second end portions for engaging with detent notch portions formed in first and second side wall portions of the base bracket when the shift lever main body is in the A/T mode shift slot,
    a push button mounted on an upper portion of the shift lever main body, and
    a projecting portion formed in the shift lever main body;
    a selector lever swingably mounted on the transverse shaft, said selector lever comprising an opening for receiving the projecting portion so as to move together with the shift lever main body when the shift lever main body is in the A/T mode shift slot and for disengaging from the projecting portion so as to allow the shift lever main body to swing in the front and rear direction and to turn on electric switches when the shift lever main body is in the M/T mode shift slot; and
    a guide lever, swingably mounted on the transverse shaft, comprising a guide hole for engaging with the first end portion of the position pin, said guide hole comprising an upside edge for limiting upward movement of the first end portion of the position pin and thereby causing the position pin to incline so that the second end portion descends to a lower position relative to the second side wall to allow the position pin to swing between an R range and an L range in detent notch portions when the shift lever is changed into the M/T mode shift slot.

2. A shift lever apparatus as claimed in claim 1 wherein the base bracket comprises the A/T mode shift slot and the M/T mode shift slot which are connected by a switching slot for allowing the shift lever main body to move between the A/T mode shift slot and the M/T mode shift slot in a left and right direction.

3. A shift lever apparatus as claimed in claim 2 wherein the shift lever further comprises a base member swingably mounted on the transverse shaft for allowing the main body to swing in the front and rear direction, and the main body is swingably mounted on the base member through a longitudinal shaft for allowing the main body to swing in the left and right direction and thereby to move between the A/T mode shift slot and the M/T mode shift slot through the switching slot.

4. A shift lever apparatus as claimed in claim 3 wherein the shift lever is located between the first and second side wall portions of the base bracket, and the selector lever and the guide lever are positioned between the shift lever and the first side wall portion of the base bracket.

5. A shift lever apparatus as claimed in claim 4 wherein the guide lever is located between the selector lever and the first side wall portion of the base bracket, and the M/T mode shift slot extends in the front and rear direction between the A/T mode shift slot and the second side wall portion of the base bracket.

6. A shift lever apparatus as claimed in claim 5 wherein the guide lever is fixed to the selector lever, and spaced apart from the selector lever.

7. A shift lever apparatus as claimed in claim 5 wherein the detent notch portion in the second side wall portion of the base bracket comprises an upside edge for holding the position pin in a horizontal attitude with the upside edge of the guide hole of the guide lever, and the position pin is substantially parallel to the transverse shaft when the position pin is in the horizontal attitude.

8. A shift lever apparatus as claimed in claim 7 wherein the switching slot extends in the left and right direction at a position to allow the main body to move from the A/T mode shift slot to the M/T mode shift slot when the shift lever is in a D range position.

9. A shift lever apparatus as claimed in claim 8 wherein the shift lever further comprises a compression rod for lowering the position pin when the push button is pressed, and a coil spring for urging the compression rod upward.

10. A shift lever apparatus as claimed in claim 9 wherein the position pin is attached to the compression rod, the guide lever is substantially parallel to the selector lever, and the selector lever comprises a portion for holding the selector lever in the D range position when the main body is in the M/T mode shift slot.

11. A shift lever apparatus for an automatic transmission, comprising:
    a base bracket member adapted to be fixed to a vehicle body, the base bracket member comprising a top portion formed with an automatic transmission mode shift slot and a manual transmission mode shift slot which are connected by a switching slot, and first and second side wall portions each formed with a detent notch portion;
    a shift lever assembly comprising a shift lever main body which is supported on the base bracket member through a transverse shaft for allowing the shift lever main body to swing in a front and rear direction, and which is formed with a projecting portion, and a base member which is swingably mounted on the transverse shaft for allowing the main body to swing in the front and rear direction, the main body being swingably mounted on the base member through a longitudinal shaft for allowing the main body to swing in a left and right direction and thereby to move between the automatic transmission mode shift slot and the manual transmission mode shift slot through the switching slot, the shift lever assembly further comprising a position pin having first and second end portions for engaging with the detent notch portions formed in the first and second side wall portions of the base bracket member when the shift lever main body is in the automatic transmission mode shift slot, the shift lever assembly further comprising a push button mounted on an upper portion of the shift lever main body, for moving the position pin upward and downward, and a selector lever swingably mounted on the transverse shaft, and formed with an opening for receiving the projecting portion of the shift lever main body so as to move together with the shift lever main body when the shift lever main body is in the automatic transmission mode shift slot and for disengaging from the projecting portion so as to allow the shift lever main body to swing in the front and rear direction when the shift lever main body is in the manual transmission mode shift slot; and a guide lever swingably mounted on the transverse shaft, and formed with a guide hole for engaging with the first end portion of the position pin, said guide hole having an upside edge for limiting upward movement of the first end portion of the position pin and thereby lowering the second end portion of the position pin when the shift lever main body is moved into the manual transmission mode shift slot.

* * * * *